US012570217B1

(12) United States Patent
Vickery et al.

(10) Patent No.: US 12,570,217 B1
(45) Date of Patent: Mar. 10, 2026

(54) COMBINATION TRUCK BED ACCESSORY INCORPORATING A STORAGE BOX AND FOLDING BED COVER

(71) Applicant: Saluda Manufacturing, LLC, Columbia, SC (US)

(72) Inventors: Kevin M. Vickery, Columbia, SC (US); Max J. Taylor, Irmo, SC (US)

(73) Assignee: Saluda Manufacturing, LLC, Columbia, SC (US)

( * ) Notice: Subject to any disclaimer, the term of this patent is extended or adjusted under 35 U.S.C. 154(b) by 406 days.

(21) Appl. No.: 18/370,183

(22) Filed: Sep. 19, 2023

Related U.S. Application Data

(60) Provisional application No. 63/407,910, filed on Sep. 19, 2022.

(51) Int. Cl.
| | |
|---|---|
| *B60R 9/055* | (2006.01) |
| *B60J 7/14* | (2006.01) |
| *B60R 11/06* | (2006.01) |

(52) U.S. Cl.
CPC .............. *B60R 9/055* (2013.01); *B60J 7/141* (2013.01); *B60R 11/06* (2013.01)

(58) Field of Classification Search
CPC .......... B60J 7/041; B60J 7/141; B60J 7/1607; B60R 9/055; B60R 9/065; B60R 11/06

USPC ................. 296/37.6, 100.02, 100.06, 100.09
See application file for complete search history.

(56) References Cited

U.S. PATENT DOCUMENTS

| | | | | |
|---|---|---|---|---|
| 6,234,559 B1 * | 5/2001 | Block | .................. | B60J 7/1621 |
| | | | | 296/100.06 |
| 10,406,896 B2 * | 9/2019 | Ford | ........................ | B60J 7/041 |
| 10,603,993 B2 * | 3/2020 | Ford | ......................... | B60J 7/20 |
| 11,414,022 B2 * | 8/2022 | Johnston | ................ | B60R 9/065 |
| 11,738,627 B2 * | 8/2023 | Fournier | ................ | B60R 9/065 |
| | | | | 296/100.02 |
| 11,884,145 B2 * | 1/2024 | Pompili | ................. | B60R 5/048 |
| 2015/0047397 A1 * | 2/2015 | Lackey | ................ | E05B 63/143 |
| | | | | 70/69 |

* cited by examiner

*Primary Examiner* — Jason S Daniels
(74) *Attorney, Agent, or Firm* — Schwartz Law Firm, P.C.

(57) ABSTRACT

A combination truck bed accessory includes a storage box adapted to fit within a cargo bed of a truck, and having an open top for access to items located inside the storage box. A pocketed lid is pivotably attached to the storage box and is adapted to form a pivoted closure for the open top. A folding bed cover assembly includes a plurality of hinged cover panels adapted to fold together in a stowed condition within the pocketed lid of the storage box. From the stowed condition within the pocketed lid, the cover panels unfold into a deployed condition extending over the cargo bed of the truck.

20 Claims, 16 Drawing Sheets

COMBINATION TRUCK BED ACCESSORY INCORPORATING A STORAGE BOX AND FOLDING BED COVER

TECHNICAL FIELD AND BACKGROUND OF THE DISCLOSURE

The present disclosure relates broadly and generally to a combination truck bed accessory incorporating a heavy-duty storage box and folding bed cover assembly. The storage box is particularly applicable for holding loose items, such as tools, hardware, straps, fluid containers, cargo, gear and other such objects. All reference herein to "toolbox" is intended to cover broadly any storage container applicable for such use.

As of 2021, 59 million pickup trucks were registered in the United States, with consumers purchasing 15 million new ones. Pickups made up the second largest category of vehicles on the road at 21%. Along with the strong demand for these passenger pickup trucks, there is also strong demand for pickup truck accessories like bed-mounted toolboxes and bed covers to store and protect cargo. As a result, millions of consumers purchase pickup truck toolboxes and bed covers yearly.

However, until now, no products have provided a way to combine a truck toolbox that offers the option of a bedcover combination in one product. As a result, consumers often have to choose between using a toolbox or a cover because they cannot use both simultaneously, creating a need to uninstall either the toolbox or bedcover to use the other product. Truck owners must choose between installing a toolbox or a bed cover. Not only do truck owners have to purchase a toolbox and bed cover separately, but they must also switch out their toolbox when they want to use their bed cover.

The combination toolbox and folding bed cover assembly of the present disclosure addresses these and other issues outlined above. In exemplary embodiments described herein, the invention provides many benefits. First, truck owners can use their toolboxes while deploying the bed cover.

Second, the bed covers are conveniently folded and stored inside a pocketed lid of the toolbox. Third, the invention saves truck owners money from purchasing a toolbox and bed cover separately. Finally, the invention saves truck owners time by eliminating the need to move their toolbox when they need to use their bed cover.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a combination truck bed accessory. The truck bed accessory comprises a storage box adapted to fit within a cargo bed of a truck, and having an open top for access to items located inside the storage box. A pocketed lid is pivotably attached to the storage box and is adapted to form a pivoted closure for the open top. A folding bed cover assembly includes a plurality of hinged cover panels adapted to fold together in a stowed condition within the pocketed lid of the storage box. From the stowed condition within the pocketed lid, the cover panels unfold into a deployed condition extending over the cargo bed of the truck.

According to another exemplary embodiment, an open panel frame is pivotably attached to the storage box, and is adapted for holding the hinged cover panels in the stowed condition within the pocketed lid.

According to another exemplary embodiment, the open panel frame is independently pivotable relative to the pocketed lid. Upon deployment of the bed cover assembly, the open panel frame sits directly adjacent (e.g., atop) the storage box at its open top.

According to another exemplary embodiment, the bed cover assembly incorporates at least 3 hard cover panels. Alternatively, the bed cover assembly comprises between 2-5 hard cover panels.

According to another exemplary embodiment, a gas spring is adapted for dampening pivoting movement of the pocketed lid relative to the open top of the storage box.

According to another exemplary embodiment, the storage box has a saddle-style body. The term "saddle-style" refers to a storage box that crosses over the cargo bed of the truck and rests on the bed side rails.

According to another exemplary embodiment, the combination accessory includes means for releasably locking the pocketed lid in a closed condition over the open top of the storage box, thereby restricting access to the inside of the storage box.

According to another exemplary embodiment, the means for releasably locking the pocketed lid comprises a mechanical lid latch.

According to another exemplary embodiment, the combination accessory includes means for releasably locking the open panel frame to the pocketed lid, thereby securing the folding bed cover assembly in the stowed condition within the pocket lid.

According to another exemplary embodiment, the means for releasably locking the open panel frame comprises a mechanical frame latch.

According to another exemplary embodiment, a solid (e.g., metal) security plate is pivotably attached to the storage box, and is adapted for restricting access to the inside of the storage box when the pocketed lid is opened.

According to another exemplary embodiment, the combination accessory includes means for releasably locking the security plate in a closed condition over the open top of the storage box.

According to another exemplary embodiment, the means for releasably locking the security plate comprises a mechanical plate latch.

In another exemplary embodiment, the present disclosure comprises a light-duty truck having an open cargo bed and a combination truck bed accessory. The combination truck bed accessory includes a storage box, pocketed lid, and folding cover assembly. The storage box is secured within the cargo bed of the truck, and has an open top for access to items located inside the storage box. The pocketed lid is pivotably attached to the storage box and is adapted to form a pivoted closure for the open top. The folding bed cover assembly includes a plurality of hinged cover panels adapted to fold together in a stowed condition within the pocketed lid of the storage box. From the stowed condition within the pocketed lid, the cover panels unfold into a deployed condition extending over the cargo bed of the truck.

According to another exemplary embodiment, and a mechanical panel latch is adapted for releasably securing the bed cover assembly in the deployed condition over the cargo bed of the truck.

According to another exemplary embodiment, a cover bracket is secured to an interior side rail of the truck and is adapted to selectively engage the panel latch.

In the claims, the "means for releasably locking" may comprise any suitable mechanical lock including, for example, cam latches, compression latches, push-to-close/ slam latches, draw latches, sliding latches, and other such fasteners, locks and latches structurally or functionally equivalent thereto. In other exemplary embodiments, the "means for releasably locking" comprises an electric lock which uses electric current to control a solenoid, armature, fastener or latch. In other exemplary embodiments, the "means for releasably locking" comprises a magnetic lock.

In the claims, the "hinged" and "pivotably attached" elements may comprise, incorporate or utilize any number of different hinge types including, for example, continuous ("piano") hinges, butt hinges, butterfly hinges, case hinges, concealed hinges, constant torque hinges, flag hinges, floating hinges, flush hinges, friction hinges, geared continuous hinges, h-hinges, hl-hinges, living hinges, quick release hinges, spring-loaded hinges, damper hinges, lift assist hinges, and others.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete.

Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
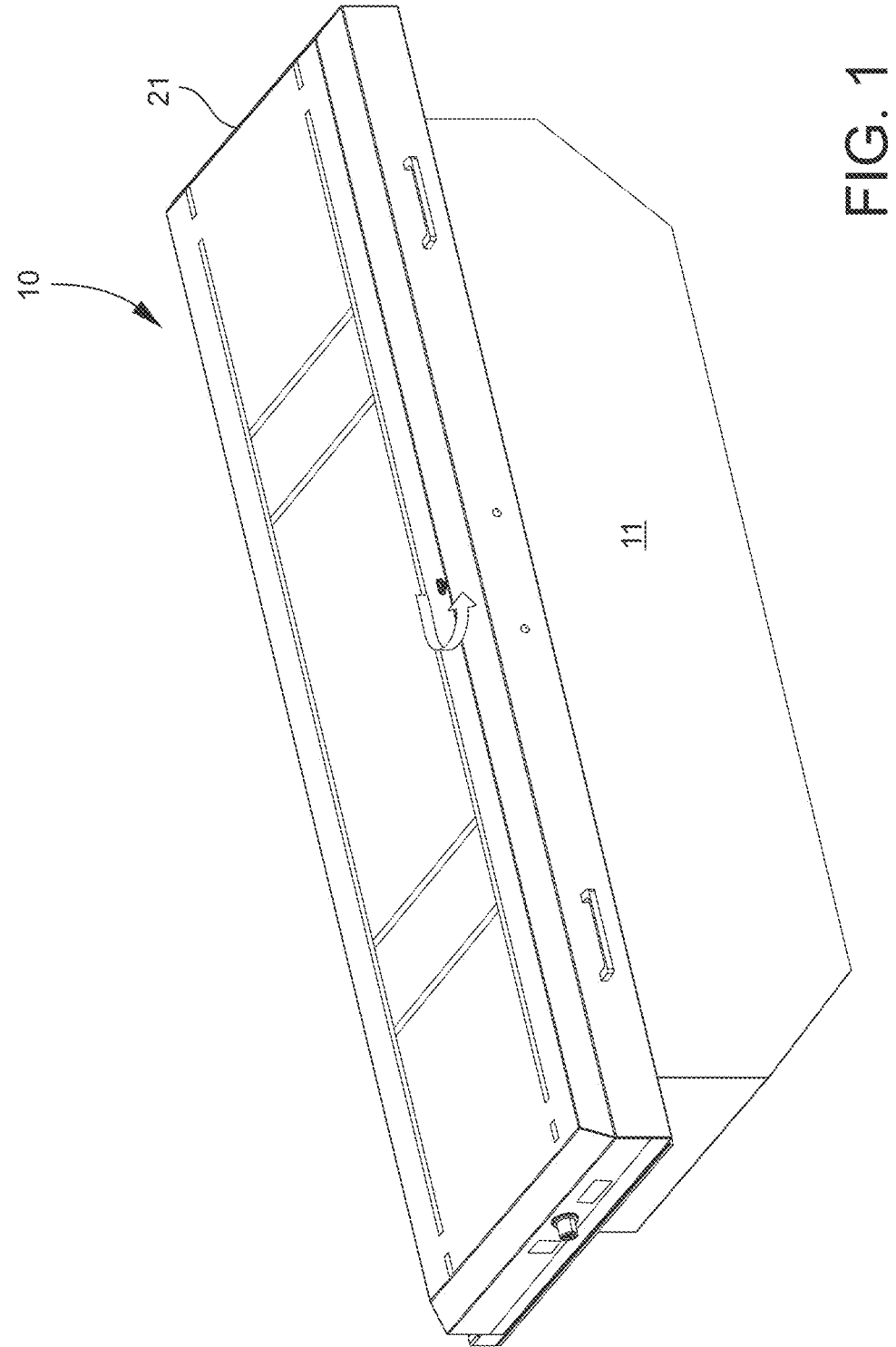
FIG. 1 is a perspective view of a combination truck bed accessory according to one exemplary embodiment of the present disclosure.
Figure 14:
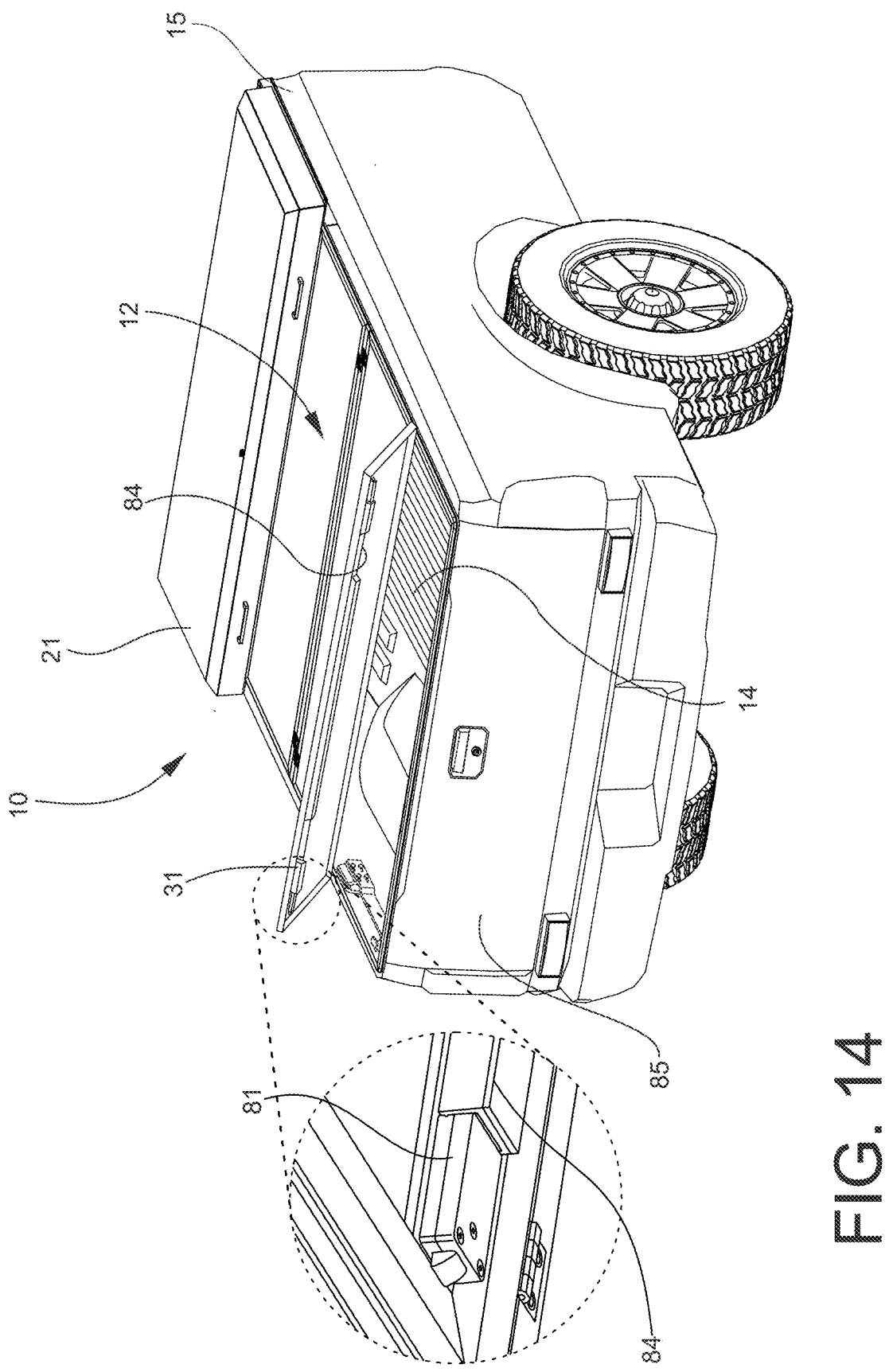
FIGS. 14, 15 and 16 are views illustrating the exemplary combination truck bed accessory installed in the open cargo bed of a light-duty truck.
Figure 15:
Figure 16:
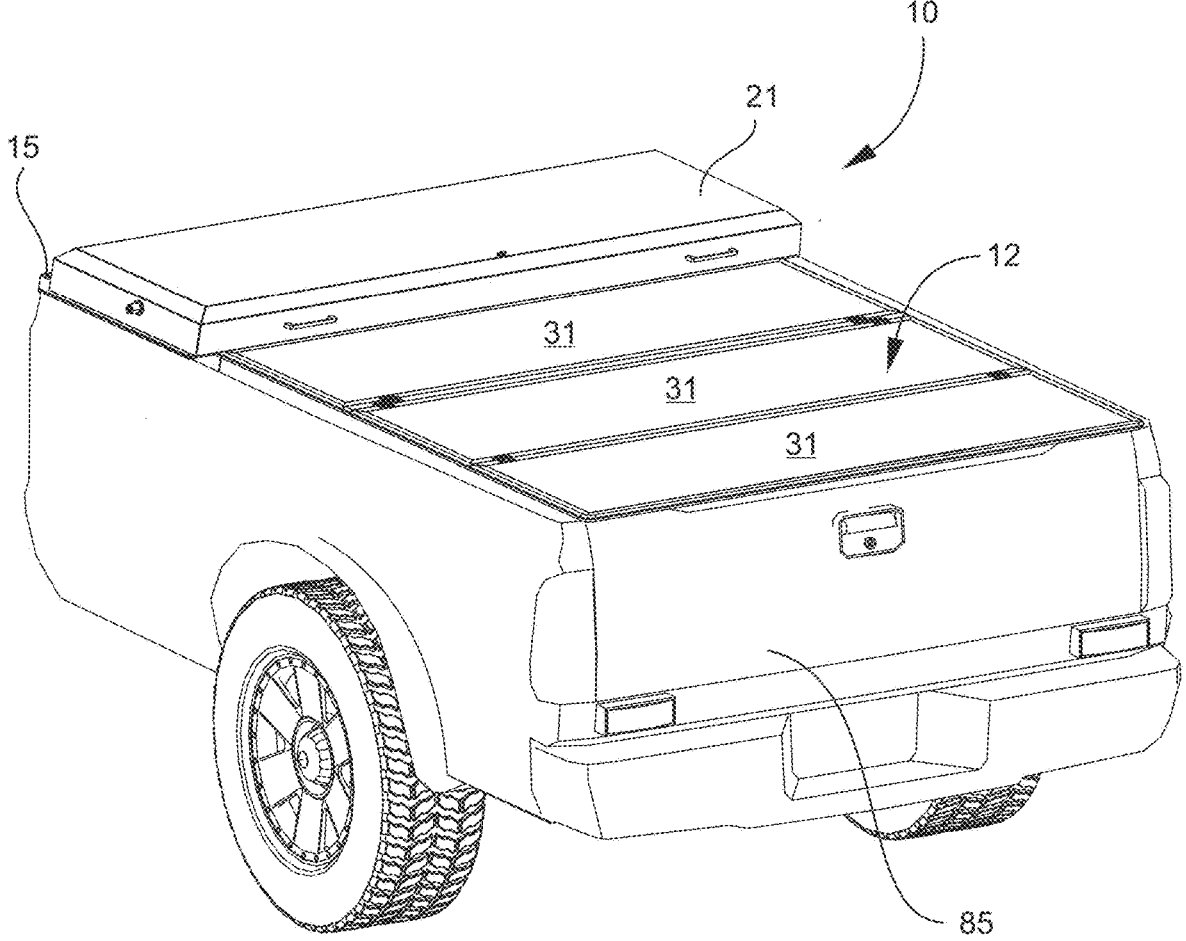

Referring now specifically to the drawings, a combination truck bed accessory according to one exemplary embodiment of the present disclosure is illustrated in FIG. 1 and shown generally at broad reference numeral 10. The present truck bed accessory 10 comprises a heavy-duty storage box 11 (e.g., toolbox) combined with a folding bed cover assembly 12-FIGS. 4 and 5. The exemplary storage box 11 has a durable saddle-style body designed to fit within an open cargo bed 14 of a light-duty truck 15 (See FIGS. 14-16), and an open top 16 for access to items located inside the storage box 11. The storage box 11 is applicable for holding, organizing and securing useful items such as tools, ropes, chains, tie-down straps and others. When deployed as described below, the bed cover assembly 12 of the exemplary accessory 10 is configured to extend over the entire open cargo bed 14 of the truck 15. See FIG. 16.

Figure 2:
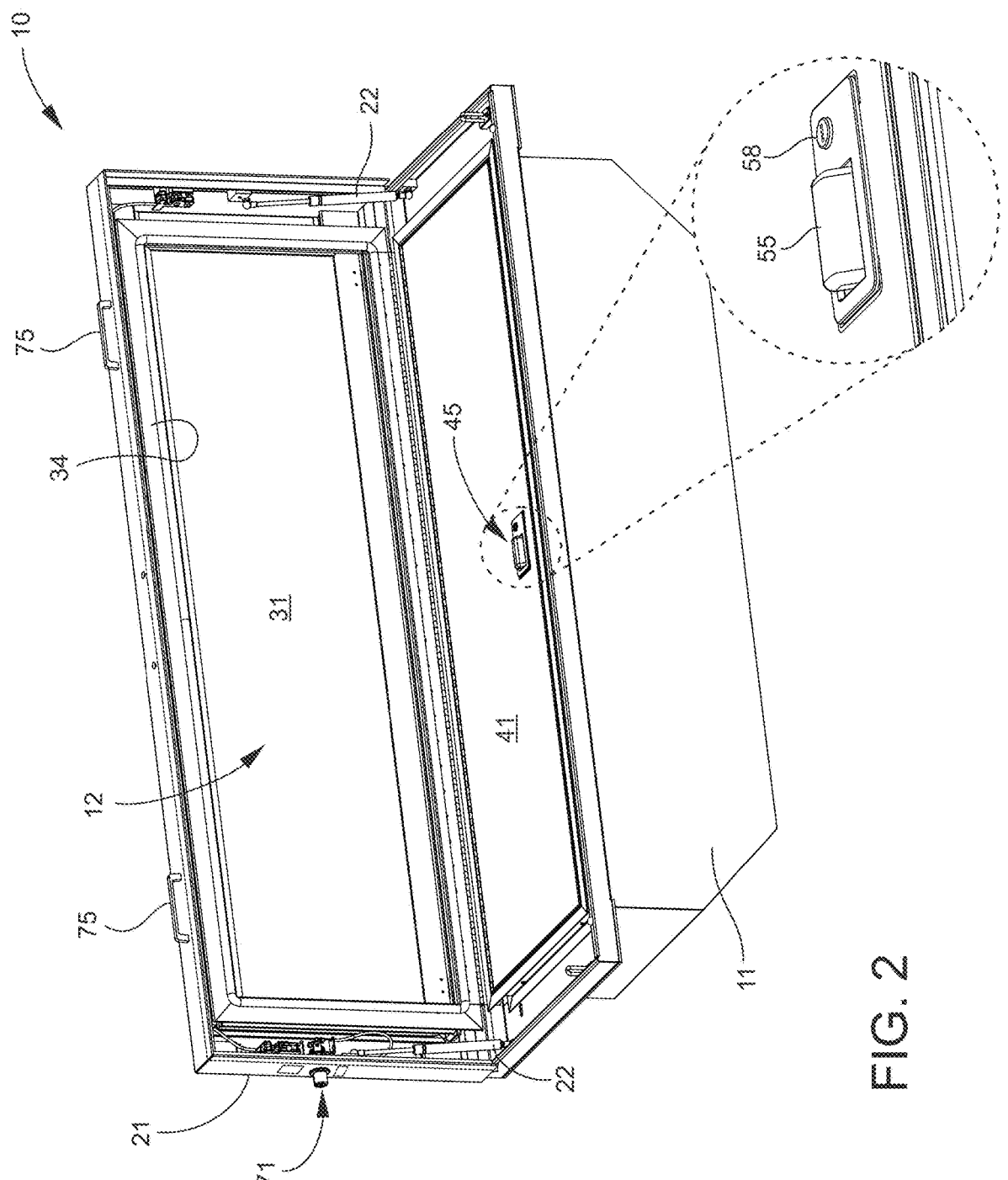
FIG. 2 is a further perspective view of the exemplary truck bed accessory with the pocketed lid lifted into an open position and the security plate closed over an open top of the storage box.
Figure 3:
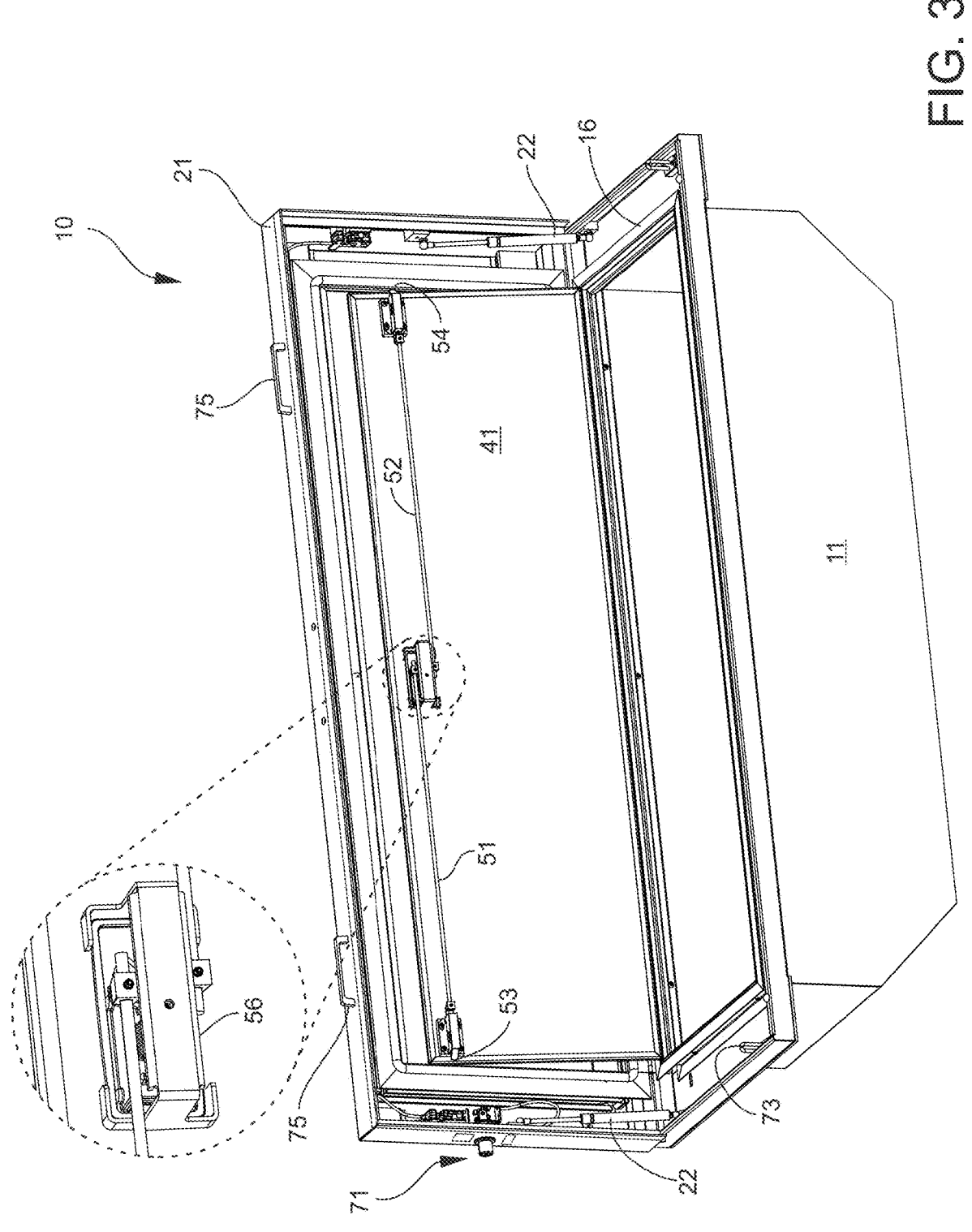
FIG. 3 is a further perspective view of the exemplary truck bed accessory with the pocketed lid and security plate both lifted into an open position enabling access to the inside of the storage box, and showing the bed cover assembly in a stowed condition.

As best shown in FIGS. 2-5, the present truck bed accessory 10 has a pocketed lid 21 adapted for temporarily holding and securing the folding bed cover assembly 12. The pocketed lid 21 is pivotably attached at the rear of the storage box 11 by one or more hinges (e.g, continuous hinge or butt hinges, not shown), and forms a pivoted closure for the open top 16 of the storage box 11. Interior gas springs 22 are located at opposite ends of the pocketed lid 21 to dampen pivoting movement of the lid 21 relative to the storage box 11. The folding bed cover assembly 12 incorporates a number of hard cover panels 31 joined together by hinges 32. See FIG. 5. The hinged cover panels 31 are designed to fold together in a stowed condition within the pocketed lid 21, as best shown in FIGS. 2 and 3, and are temporarily secured in the stowed condition by an open square panel frame 34 releasably latched to the pocketed lid 21. The open panel frame 34 is attached to the storage box 11 along a longitudinal rear edge using a continuous or "piano type" hinge. A longitudinal front edge of the panel frame 34 is pivotably attached to a first of the folding cover panels 31 using a bi-fold or "accordion-type" hinge 35. From the stowed condition within the pocketed lid 21, the cover panels 31 unfold into a deployed condition shown in FIGS. 4, 5 and 16 extending over the cargo bed 14 of the truck 15. The process of unfolding the hinged cover panels 31 from the stowed condition to the deployed condition is demonstrated in FIGS. 6-13 and described further below.

For increased storage safety, a solid metal security plate 41 shown in FIGS. 2-5 is pivotably attached to the storage box 11 using a continuous rear hinge, and may be selectively opened/closed and locked. The security plate 41 controls access to the inside of the storage box 11 when the pocketed lid 21 is opened. Upon partial or full deployment of the bed cover assembly 12, the security plate 41 is adapted to pivot upwardly through the open panel frame 34, thereby enabling access to the inside of the storage box 11 with the cover panels 31 partially or fully extended over the cargo bed 14 of the truck 15.

Figure 4:
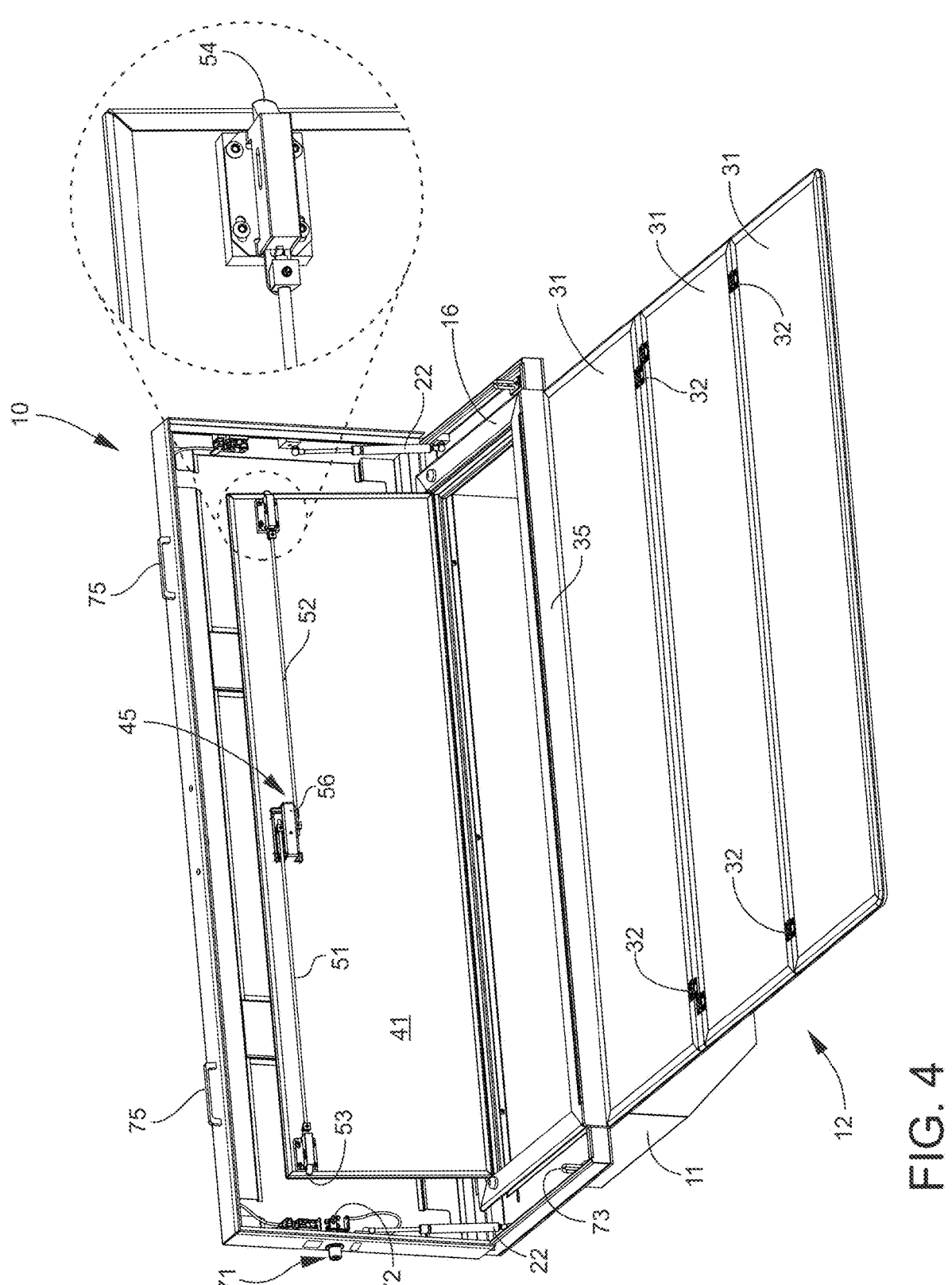
FIG. 4 is a further perspective view of the exemplary truck bed accessory with the pocketed lid and security plate both lifted into an open position enabling access to the inside of the storage box, and showing the bed cover assembly in a fully deployed condition.
Figure 5:
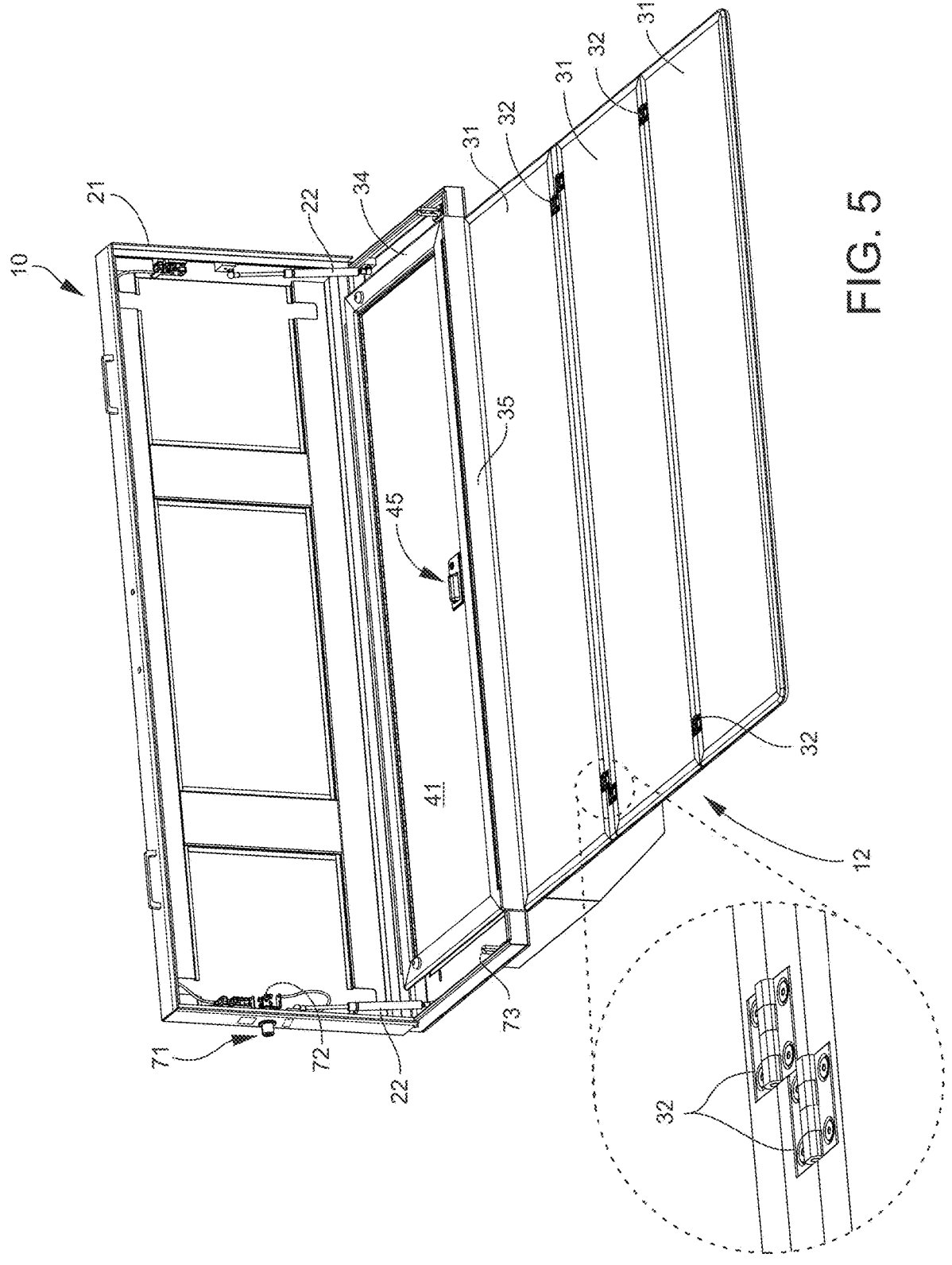
FIG. 5 is a further perspective view of the exemplary truck bed accessory with the pocketed lid lifted into an open position and the security plate closed to restrict access to the inside of the storage box, and showing the bed cover assembly in a fully deployed condition
Figure 6:
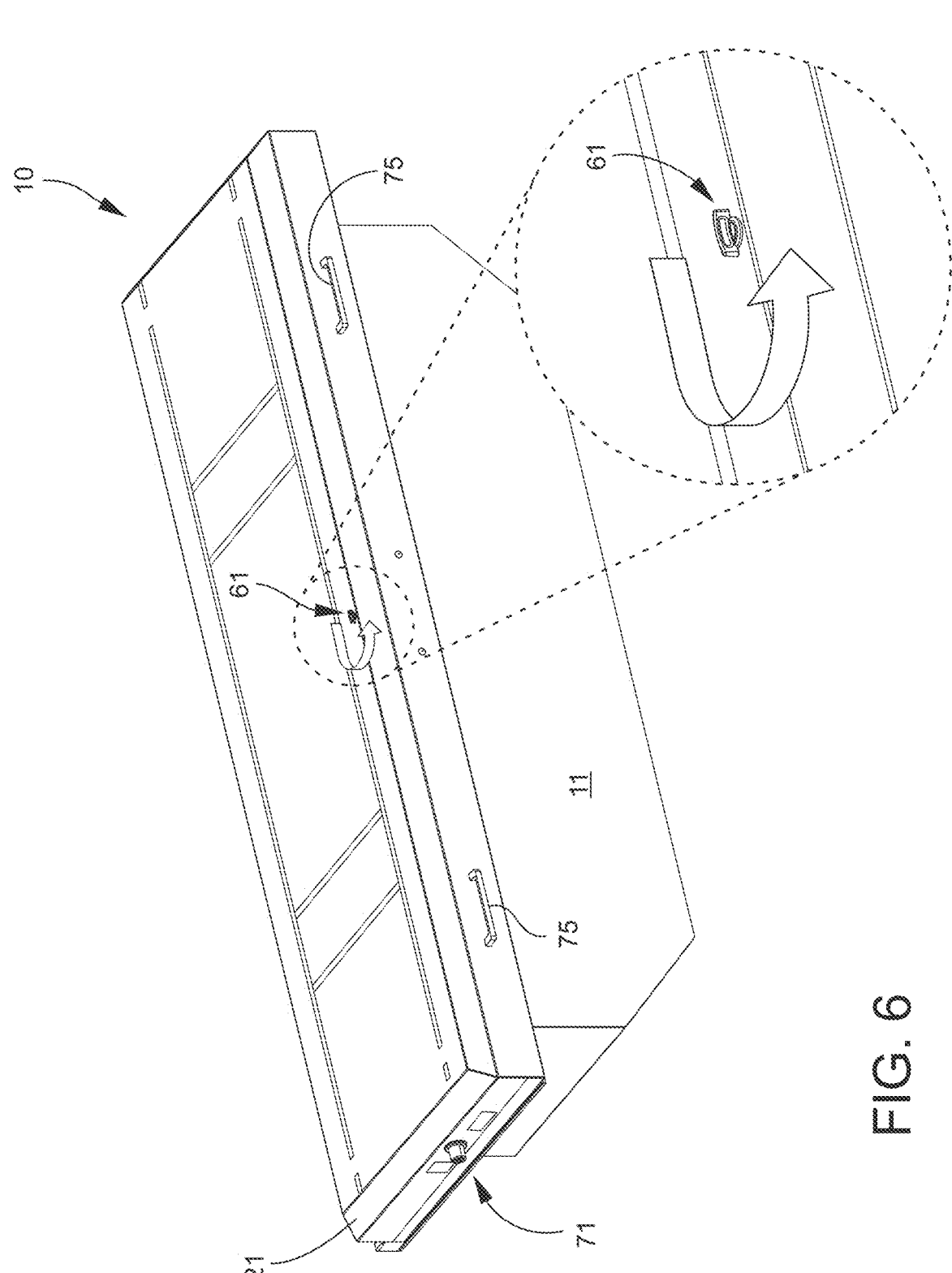
FIGS. 6-13 are sequential views demonstrating unfolding of the bed cover assembly from the stowed condition within the pocketed lid of the storage box to a fully extended and deployed condition.
Figure 7:
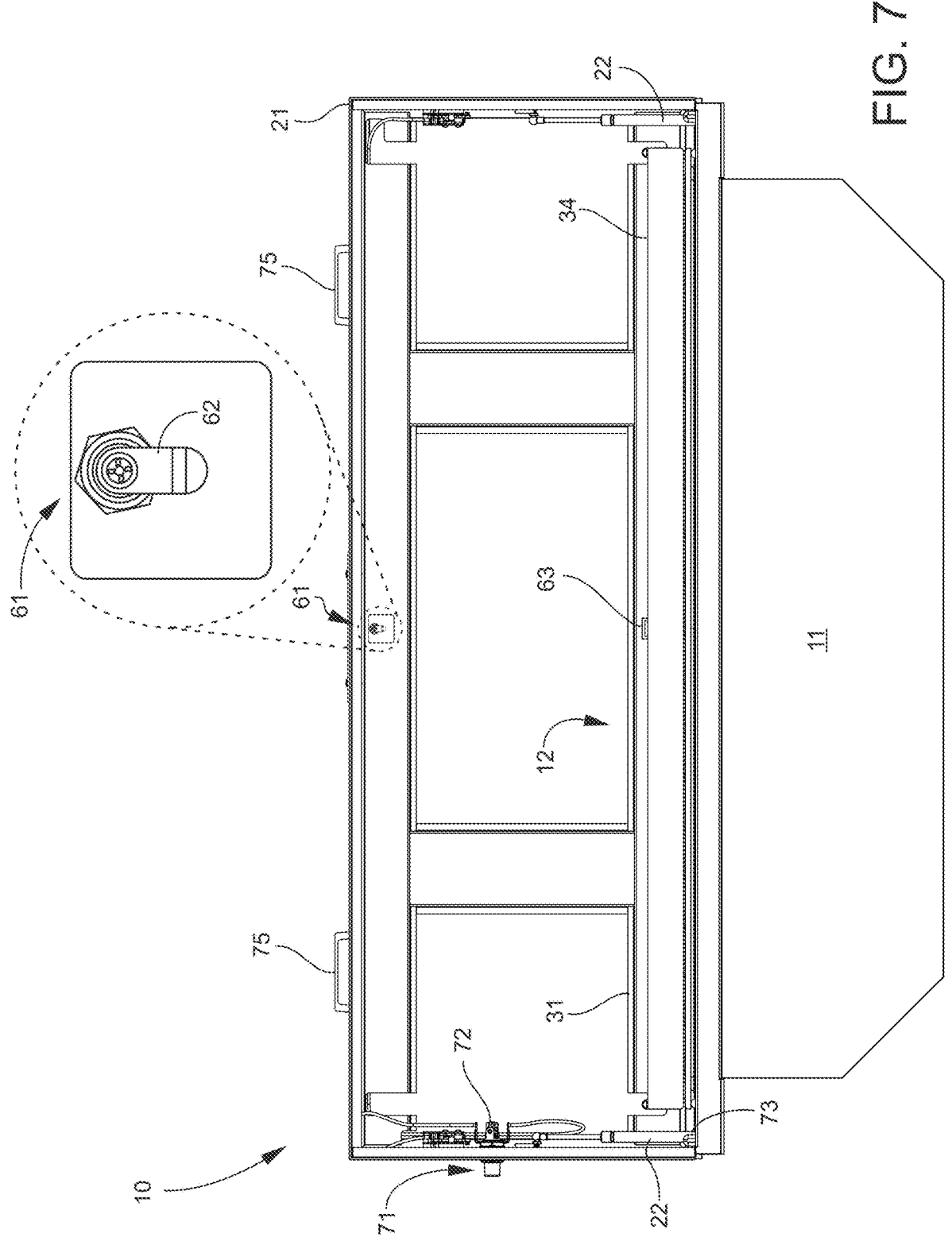
Figure 8:
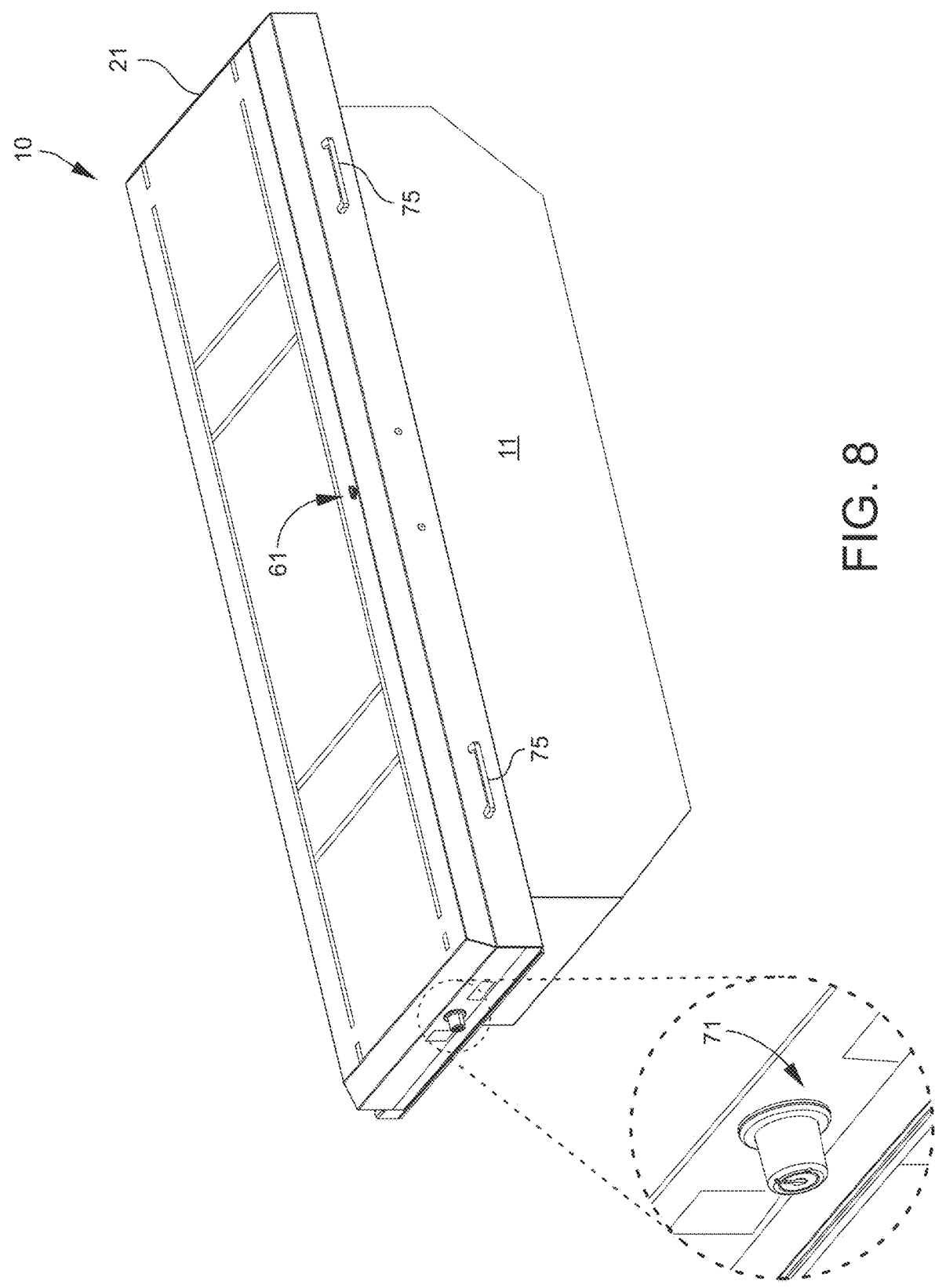

A push-to-close/slam latch 45 (or "plate latch") locks the security plate 41 in a closed position over the open top 16 of the storage box 11. As best shown in FIGS. 2, 3 and 4, the exemplary plate latch 45 incorporates cooperating actuation rods 51, 52 operatively linked to opposing spring-loaded bolts 53, 54, a topside handle 55 and keylock 56. By manually lifting the handle 55 of the security plate 41 when closed, the underside actuation rods 51, 52 shift inwardly to pull opposing bolts 53, 54 away from respective catches (not shown) formed with or affixed to the storage box 11. This allows the security plate 41 to be freely lifted to an open position shown in FIGS. 3 and 4. The security plate 41 is returned to the closed position shown in FIG. 5 by the plate latch 45, and can be locked in the closed position using a key inserted through keyway 58. Twisting the key manipulates the keylock 56 to restrict linear shifting of the actuation rods 51, 52 when the handle 55 is lifted. When locked, the opposing bolts 53, 54 remain extended within respective catches and prevent the security plate 41 from being pivoted upwardly from the closed position to the open position.

Deployment of Exemplary Bed Cover Assembly 12

FIGS. 6-13 demonstrate a process of deploying the exemplary bed cover assembly 12 from its stowed condition inside the pocket lid 21 of the storage box 11 to the deployed condition over the open cargo bed 14 of the truck 15. Before releasing and lifting the pocketed lid 21 of the storage box 11, a mechanical cam latch 61 (or "frame latch") is rotated to operatively position lever 62 (See FIG. 7) within a catch 63 located at a front edge of the open panel frame 34. When engaged, the frame latch 61 functions to hold and secure the folded bed cover assembly 12 within the pocketed lid 21. The closed pocketed lid 21 is released from the storage box 11 by manually actuating a mechanical pushbutton latch 71 (or "lid latch"), best shown in FIGS. 7 and 8. When the lid latch 71 is pressed, cooperating latch bolts 72 pull away from respective catches 73 thereby allowing the pocketed lid 21 to pivot upwardly from the storage box 11 to an open position. For added security, a keyed locking mechanism may be incorporated in the lid latch 71 to restrict manual actuation of the pushbutton.

Figure 9:
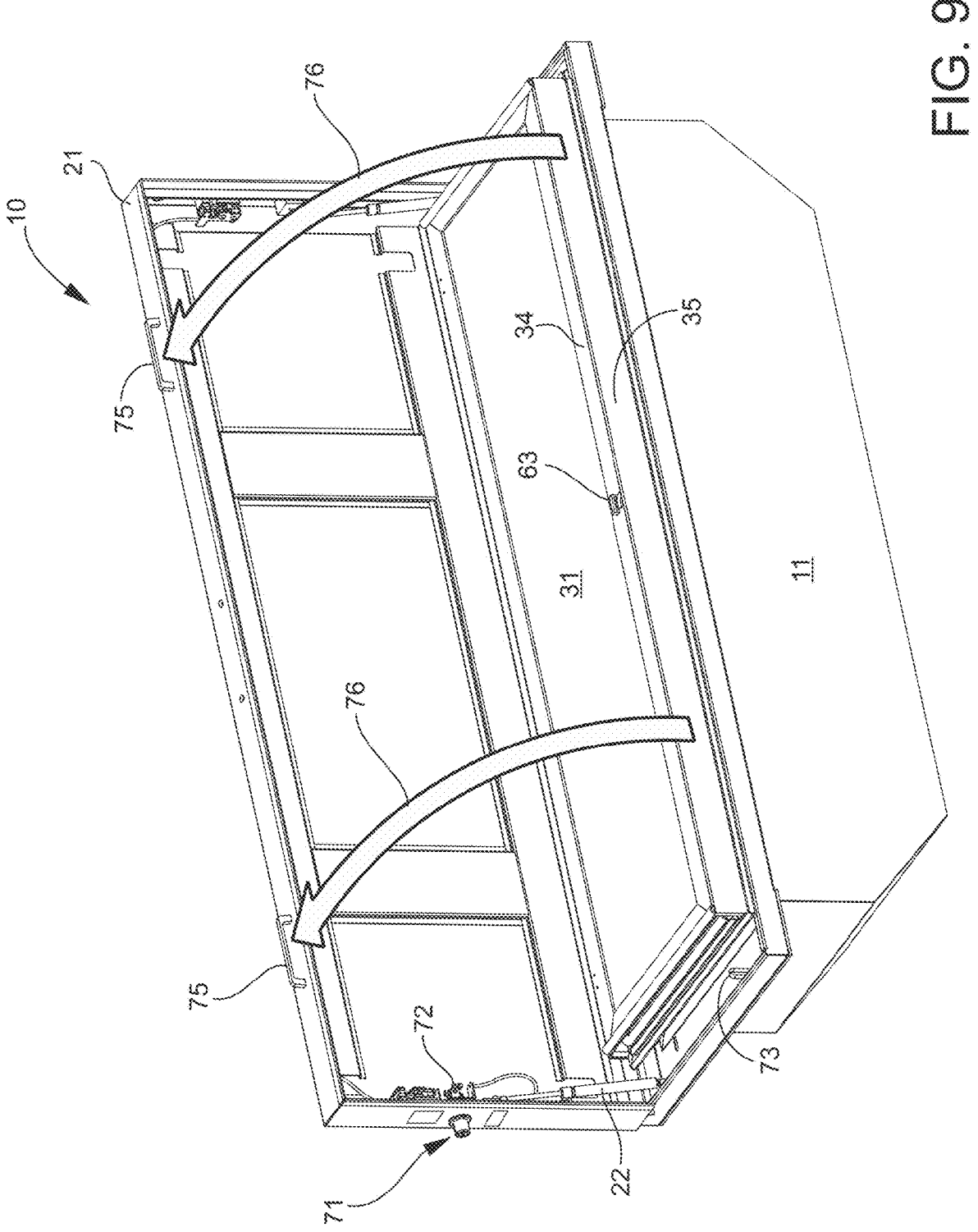
Figure 10:
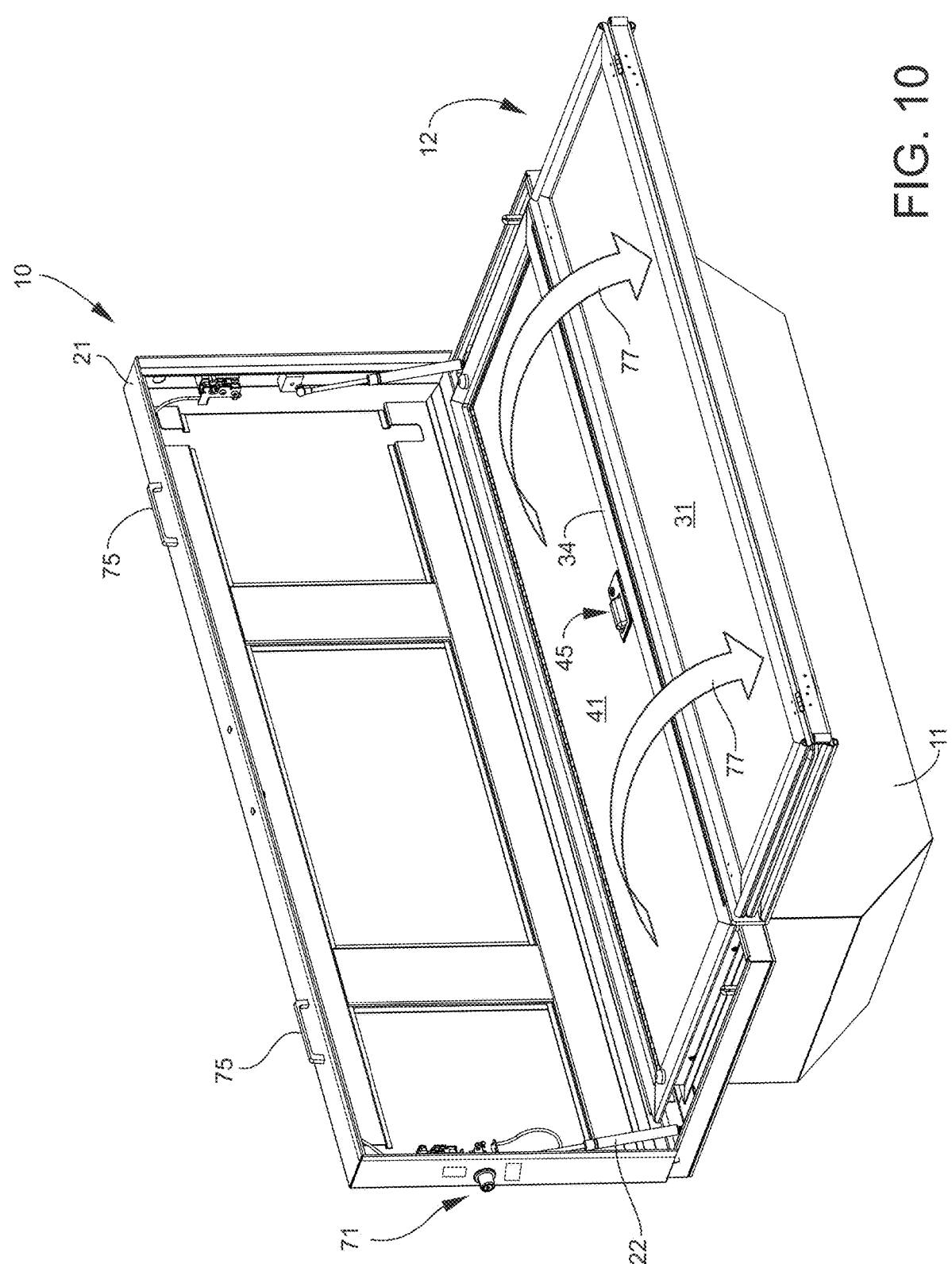
Figure 11:
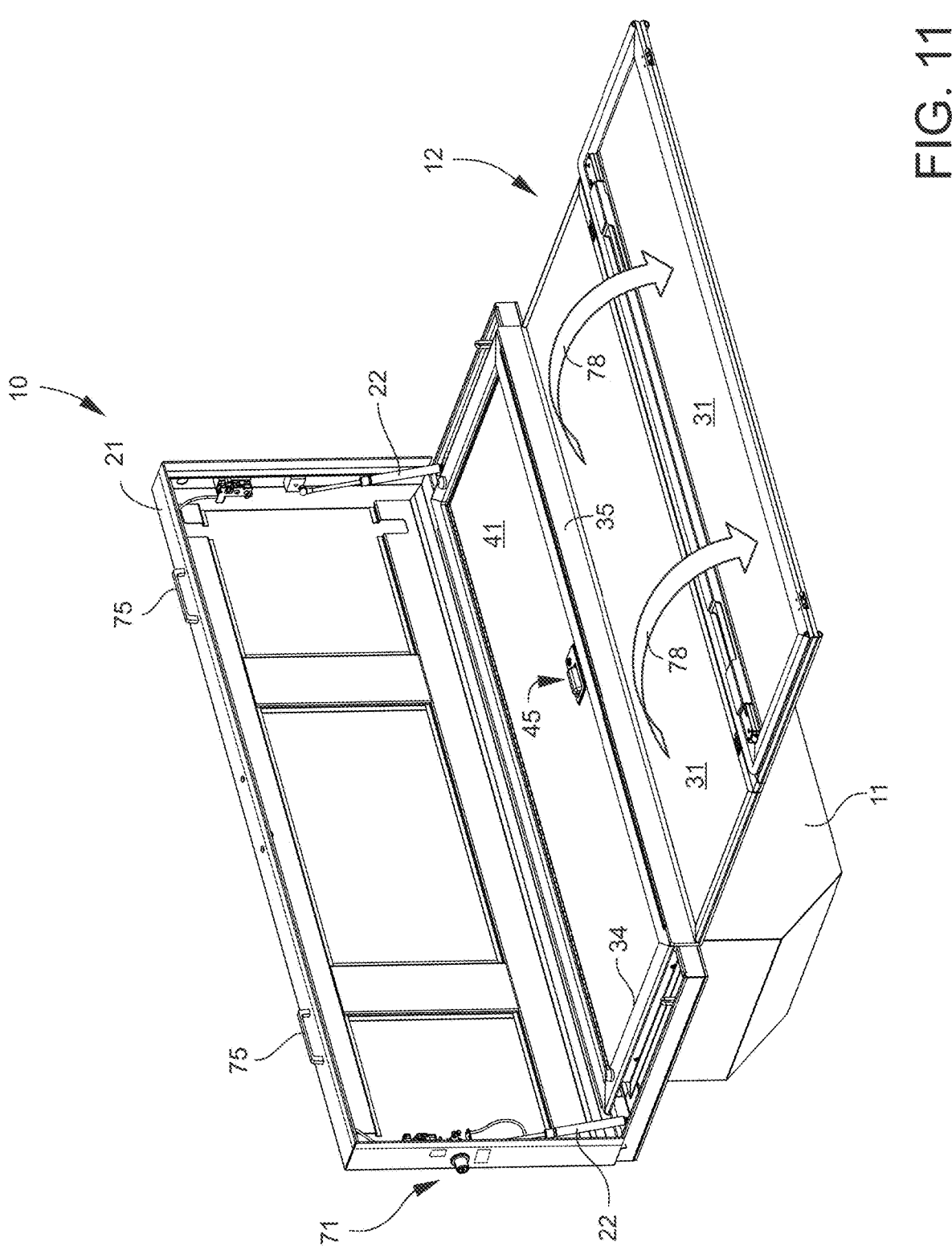
Figure 12:
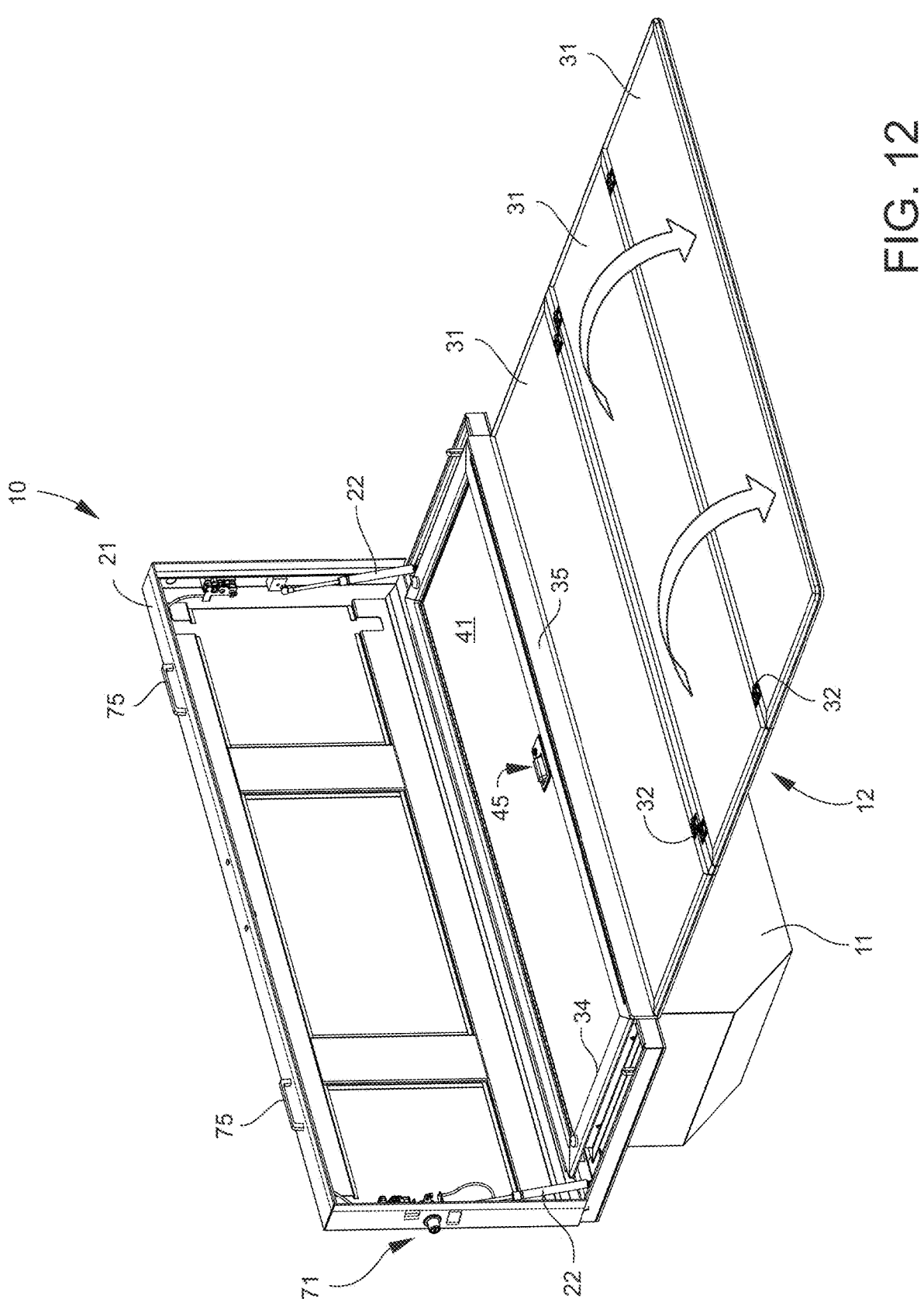
Figure 13:
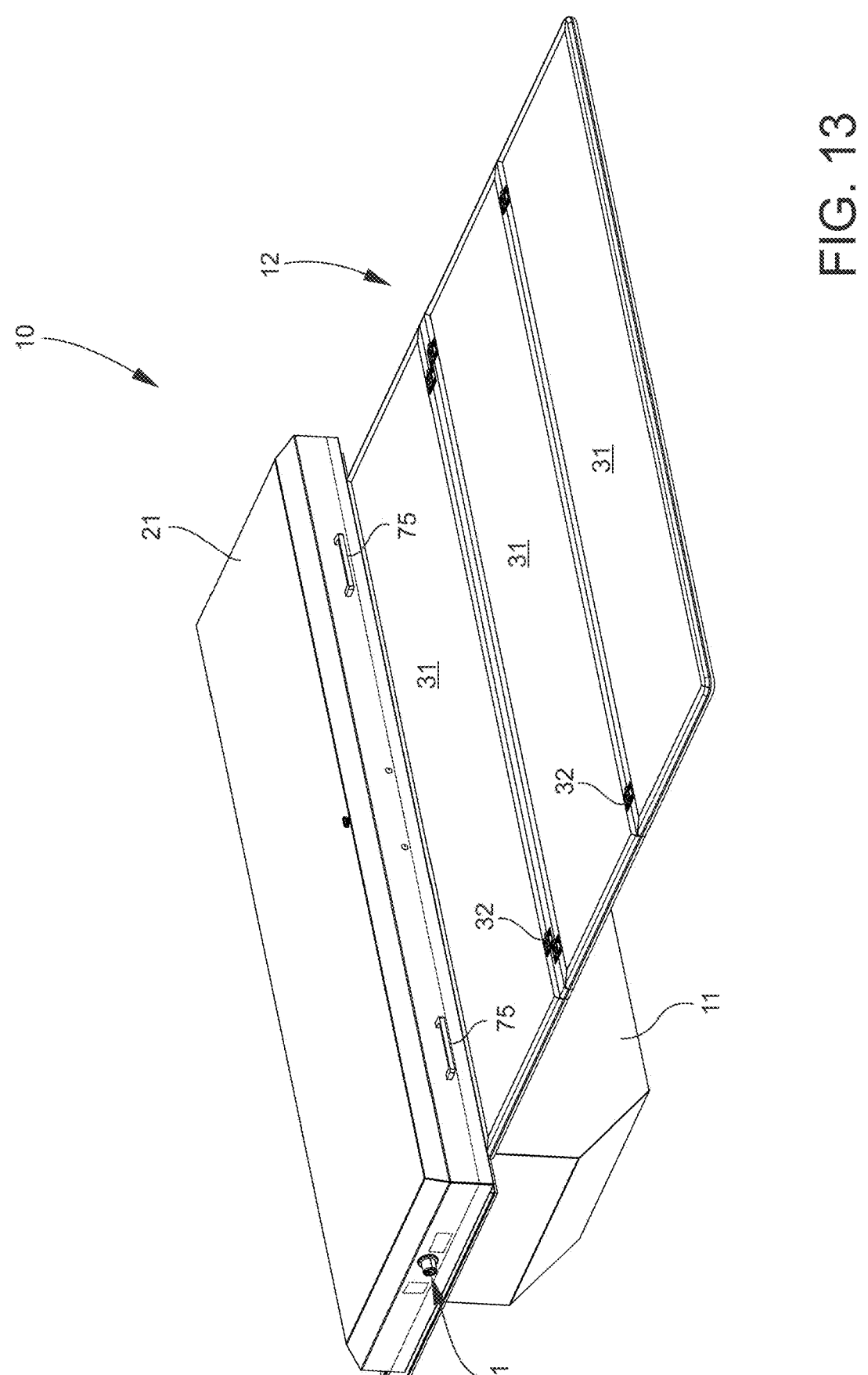

With the frame latch 61 engaged and lid latch 71 released, the pocketed lid 21 is lifted by handles 75 from its closed position to the open position as demonstrated by arrows 76 in FIG. 9. The frame latch 61 is then released, thereby enabling downward pivoting of the open panel frame 34 and bed cover assembly 12 to the top 16 of storage box 11. See FIG. 9. The accordion-type hinge 35 allows the joined cover panels 31 to unfold outwardly from the open panel frame 34 as demonstrated by arrows 77 in FIG. 10. The cover panels 31 further unfold to a fully deployed condition as demonstrated by arrows 78, 79 of FIGS. 11 and 12. When the cover assembly 12 is fully deployed, the security plate 41 may be pivoted upwardly through the square opening defined by the panel frame 34, thereby permitting access to the inside of the storage box 11, and may be subsequently closed and locked as previously described. To uncover the cargo bed 14 of the truck 15, the exemplary bed cover assembly 12 is folded and returned to the pocket lid 21 for storage in a reverse manner. At all times during this process and in-use and when stowed, the exemplary bed cover assembly 12 remains securely attached to the storage box 11 of the combination accessory 10.

Referring to FIGS. 13-16, when fully deployed—e.g, extended over the cargo bed 14, one or more of the folding cover panels 31 can be readily lifted in a manner that will give full access to the bed interior. The rearward most cover panel 31 may incorporate a push-to-close/slam latch 81 ("panel latch") designed to engage clamp-on bed brackets 82 secured to interior side rails of the truck bed 14. The panel latch 81 temporarily holds the bed cover assembly 12 in the deployed condition, and may be conveniently released using one or more pull cables 84. The extended and secured bed cover assembly 12 does not interfere with opening/closing of the tailgate 85, so that the truck bed 14 can be further accessed through the open tailgate. The exemplary bed cover assembly 12 may also include weather stripping along its longitudinal side edges, panel joints, and at the pocketed lid 21 of the storage box 11 to seal the truck bed 14 and keep water out of the cargo area.

In exemplary embodiments, the storage box 11 may be constructed of aluminum or other metal, or a durable resin-injected polymer. The hard panels 31 of bed cover assembly 12 may be constructed of aluminum, fiberglass, polymer resin or combination of such materials. In alternative embodiments, the combination accessory 10 of the present disclosure may comprise a soft bed cover with one or multiple folding frames.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112 (f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A combination truck bed accessory, comprising:
a storage box adapted to fit within a cargo bed of a truck, and having an open top for access to items located inside said storage box;
a pocketed lid pivotably attached to said storage box and adapted to form a pivoted closure for said open top; and
a folding bed cover assembly comprising a plurality of hinged cover panels adapted to fold together in a stowed condition within said pocketed lid of said storage box, and to unfold from said pocketed lid in a deployed condition extending over the cargo bed of the truck.

2. The combination truck bed accessory according to claim 1, and comprising an open panel frame pivotably attached to said storage box, and adapted for holding said hinged cover panels in the stowed condition within said pocketed lid.

3. The combination truck bed accessory according to claim 2, wherein said open panel frame is independently pivotable relative to said pocketed lid, and upon deployment of said bed cover assembly, said open panel frame sits adjacent said open top of said storage box.

4. The combination truck bed accessory according to claim 1, wherein said bed cover assembly comprises at least 3 hard cover panels.

5. The combination truck bed accessory according to claim 1, and comprising a gas spring adapted for dampening pivoting movement of said pocketed lid relative to said open top of said storage box.

6. The combination truck bed accessory according to claim 1, wherein said storage box comprises a saddle-style body.

7. The combination truck bed accessory according to claim 1, and comprising means for releasably locking said pocketed lid in a closed condition over said open top of said storage box, thereby restricting access to the inside of said storage box.

8. The combination truck bed accessory according to claim 7, wherein said means for releasably locking said pocketed lid comprises a mechanical lid latch.

9. The combination truck bed accessory according to claim 2, and comprising means for releasably locking said open panel frame to said pocketed lid, thereby securing said bed cover assembly in the stowed condition within said pocket lid.

10. The combination truck bed accessory according to claim 9, wherein said means for releasably locking said open panel frame comprises a mechanical frame latch.

11. The combination truck bed accessory according to claim 1, and comprising a solid security plate pivotably attached to said storage box, and adapted for restricting access to the inside of said storage box when said pocketed lid is opened.

12. The combination truck bed accessory according to claim 11, means for releasably locking said security plate in a closed condition over said open top of said storage box.

13. The combination truck bed accessory according to claim 12, wherein said means for releasably locking said security plate comprises a mechanical plate latch.

14. A combination truck bed accessory, comprising:
a storage box adapted to fit within a cargo bed of a truck, and having an open top for access to items located inside said storage box;
a pocketed lid pivotably attached to said storage box and adapted to form a pivoted closure for said open top; and
a folding bed cover assembly comprising a plurality of hinged cover panels adapted to fold together in a stowed condition within said pocketed lid of said storage box, and to unfold from said pocketed lid in a deployed condition extending over the cargo bed of the truck;
an open panel frame pivotably attached to said storage box, and adapted for holding said hinged cover panels in the stowed condition within said pocketed lid, and wherein said open panel frame is independently pivotable relative to said pocketed lid, such that upon deployment of said bed cover assembly, said open panel frame sits adjacent said open top of said storage box; and
a solid security plate pivotably attached to said storage box, and adapted for selectively restricting access to the inside of said storage box when said pocketed lid is opened, and upon deployment of said bed cover assembly, said security plate is adapted for pivoting upwardly through said open panel frame to permit access to the inside of said storage box.

15. The combination truck bed accessory according to claim 14, means for releasably locking said security plate in a closed condition over said open top of said storage box.

16. The combination truck bed accessory according to claim 15, wherein said means for releasably locking said security plate comprises a mechanical plate latch.

17. The combination truck bed accessory according to claim 14, and comprising a mechanical frame latch for releasably locking said panel frame to said pocketed lid, thereby securing said bed cover assembly in the stowed condition within said pocket lid.

18. A light-duty truck having an open cargo bed and a combination truck bed accessory, said combination truck bed accessory comprising:

a storage box secured within the cargo bed of said truck, and having an open top for access to items located inside said storage box;

a pocketed lid pivotably attached to said storage box and adapted to form a pivoted closure for said open top; and a folding bed cover assembly comprising a plurality of hinged cover panels adapted to fold together in a stowed condition within said pocketed lid of said storage box, and to unfold from said pocketed lid in a deployed condition to extend over said cargo bed of said truck.

19. The light-duty truck according to claim 18, and comprising a mechanical panel latch adapted for releasably securing said bed cover assembly in the deployed condition over said cargo bed of said truck.

20. The light-duty truck according to claim 19, and comprising a cover bracket secured to an interior side rail of said truck and adapted to selectively engage said panel latch.

\* \* \* \* \*